(12) United States Patent
Philpott et al.

(10) Patent No.: US 8,433,914 B1
(45) Date of Patent: Apr. 30, 2013

(54) MULTI-CHANNEL TRANSACTION SIGNING

(75) Inventors: Robert S. Philpott, Andover, MA (US); Yong Qiao, Acton, MA (US); Michael J. O'Malley, Lowell, MA (US); Daniel V. Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 345 days.

(21) Appl. No.: 12/820,829

(22) Filed: Jun. 22, 2010

Related U.S. Application Data

(60) Provisional application No. 61/307,893, filed on Feb. 25, 2010.

(51) Int. Cl.
*H04L 9/32* (2006.01)

(52) U.S. Cl.
USPC ............................................ 713/180; 713/176

(58) Field of Classification Search .................. 713/176, 713/180
See application file for complete search history.

(56) References Cited

U.S. PATENT DOCUMENTS

| | | | |
|---|---|---|---|
| 7,058,597 B1* | 6/2006 | Ronning et al. | 705/26.35 |
| 8,239,683 B2* | 8/2012 | Scherzer et al. | 713/180 |
| 2001/0056410 A1* | 12/2001 | Ishigaki | 705/67 |
| 2003/0046539 A1* | 3/2003 | Negawa | 713/163 |
| 2008/0028447 A1 | 1/2008 | O'Malley et al. | |
| 2010/0057614 A1* | 3/2010 | Rainey et al. | 705/42 |
| 2010/0077222 A1* | 3/2010 | Scherzer et al. | 713/180 |
| 2011/0173122 A1* | 7/2011 | Singhal | 705/44 |
| 2011/0235806 A1* | 9/2011 | Fukuda | 380/282 |
| 2011/0276496 A1* | 11/2011 | Neville et al. | 705/75 |
| 2012/0030745 A1* | 2/2012 | Bauer | 726/9 |

OTHER PUBLICATIONS

TECS Week: Key Management Protocols and Compositionality John Mitchell Stanford 2005.*
Derived unique key per transaction Jun. 2, 2009.*
Enhancing authentication in eBanking with NFC enabled mobile phones Diego Alejandro Ortiz-Yepes Aug. 11, 2008.*
http://mobiletidings.com/2009/02/20/wap-push-over-sms/ WAP Push over SMS Jeroen Feb. 20, 2009.*
Weigold et al., "The Zurich Trusted Information Channel—An Efficient Defence Against Man-in-the Middle Malicious Software Attacks," Trusted Computing—Challenges and Applications, Lecture Notes in Computer Science, 2008, vol. 4968/2008, Springer Berlin / Heidelberg, pp. 75-91.

* cited by examiner

*Primary Examiner* — Kambiz Zand
*Assistant Examiner* — Benjamin Kaplan
(74) *Attorney, Agent, or Firm* — BainwoodHuang

(57) ABSTRACT

A transaction system combats malware and phishing-based MitM attacks on transaction processing systems by using digital signatures to integrity-protect the user-verified transaction data. With this system, a user submits a transaction from a client device (e.g., desktop web browser) over a communications channel to a server device, such as a transaction server. Before accepting the transaction, the transaction server securely delivers all relevant transaction data to a second device (e.g., the signing device), such as a smart phone, in the possession of the user. The signing device has its own distinct communication channel with the server device. The user verifies the data and the signing device creates a digital signature value for the transaction. The user submits the signature to the transaction server to confirm the transaction with the transaction server.

18 Claims, 3 Drawing Sheets

MULTI-CHANNEL TRANSACTION SIGNING

BACKGROUND

Client-server systems provide electronic access by the client to data, information, accounts and other material stored at the server. In financial transactions, the system provides a client electronic access to accounts and financial resources. In a client-server transaction, a client device is required to prove to the server device that it is an authentic client, and not some impersonator or other unauthorized party. Protocols are known by which a client device proves to a server device its authenticity, while at the same time it does not reveal information that could be misused by a third party. In one arrangement, certain client-server systems utilize transaction signing to allow client devices the ability to prove authenticity to a server device.

For example, certain transaction signing solutions use a single device platform (e.g., the client device, such as a user's personal computer) to both submit a transaction request to a transaction server and to generate a transaction signature. Other, more secure transaction signing solutions utilize a second, signing device for generation of the digital signature. In use, the client device transmits a transaction request to the server device over a network connection. In response, the server device transmits certain transaction information back to the client device via the network connection. Upon receipt of the transaction information by the client device, the client device operator enters required parts of the transaction information into the signing device, where the signing device is disconnected from (i.e., not disposed in electrical communication with) both the client device and the server device. Once the signing device generates and displays a resulting electronic signature, the client device operator enters the electronic signature into the client device and transmits the electronic signature to the server device to complete the transaction signing process.

SUMMARY

Conventional transaction signing solutions suffer from a variety of deficiencies. For example, the single device platform that submits the transaction request to a transaction server and generates the transaction signature is subject to malware-based and phishing-based man-in-the-middle (MitM) attacks which can surreptitiously modify the transaction data. Additionally, the use of a second, disconnected signing device to generate a digital signature, while providing a more secure transaction signing solution, requires the client device operator to manually enter important transaction data into the client device. Such a process can be error-prone and limit the amount of data that can be realistically included in the signature. In addition, such signing devices are often relatively expensive to manufacture and purchase.

By contrast, embodiments of the present invention relate to a transaction system that combats malware and phishing-based MitM attacks on transaction processing systems by using digital signatures to integrity-protect the user-verified transaction data. With this system, a user submits a transaction from a client device (e.g., desktop web browser) over a communications channel to a server device, such as a transaction server. Before accepting the transaction, the transaction server securely delivers all relevant transaction data to a second device (e.g., the signing device), such as a smart phone, in the possession of the user. The signing device has its own distinct communication channel with the server device. The user verifies the data and the signing device creates a cryptographic digital signature value for the transaction. The user submits the signature either via the client device or directly from the signing device to confirm the transaction with the transaction server.

By generating the transaction signature on a signing device separate from the client device where the transaction was initiated, the transaction system provides a level of security to the transaction between the client device and the transaction server. The transaction system takes advantage of connectivity available in today's mobile devices (e.g., smart phones) to securely deliver the transaction data to the signing device, (e.g., a signing application executed by the signing device). This minimizes or eliminates usability problems typically associated with manual data entry of the transaction information into the signing device.

Additionally, the proposed solution can be implemented in a software-based form-factor using a mobile phone as the signing device, which has significant cost and deployment advantages over hardware-based signing devices. Another advantage is the ability to provide privacy protection and authentication by encrypting and signing the transaction data being sent to the signing device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
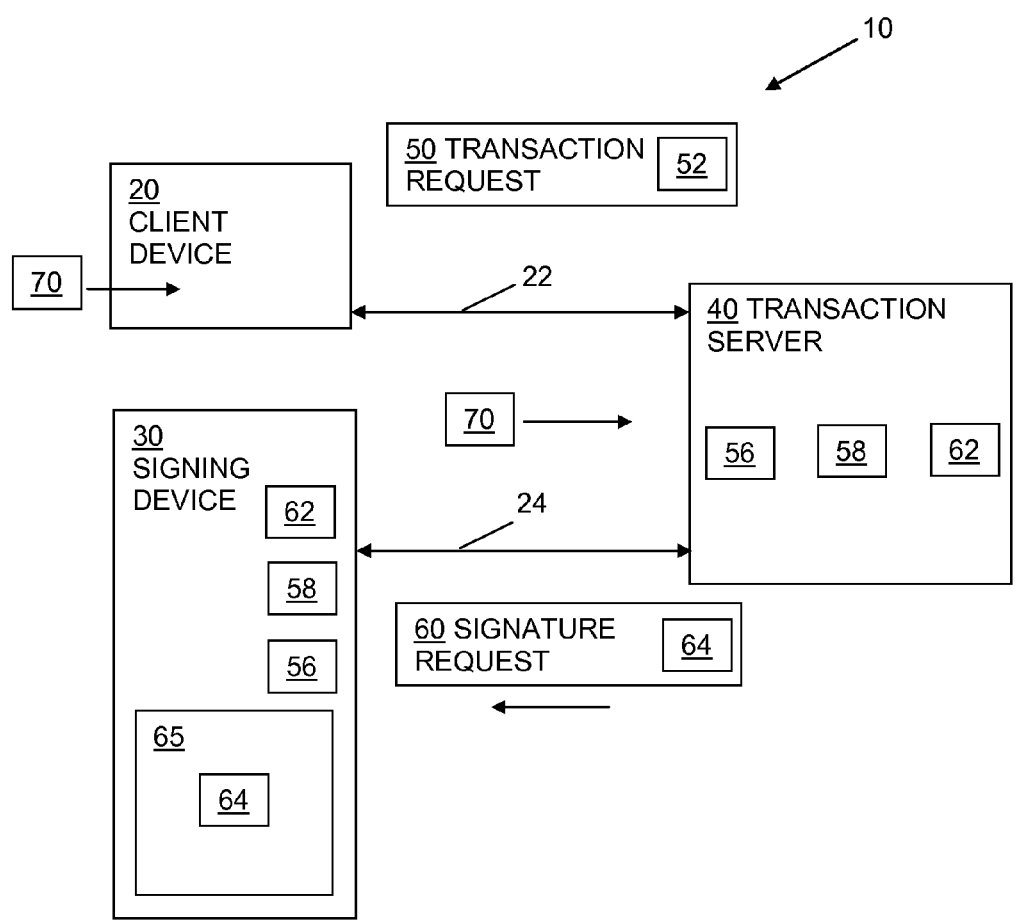
FIG. 1 illustrates a schematic representation of an example transaction system, according to one embodiment.

FIG. 1 illustrates a schematic representation of a transaction system 10 having a client device 20, a signing device 30, and a transaction server 40. The signing device 30, such as a smartphone (e.g., a mobile telephone configured with computer-like capabilities), and the transaction server 40 communicate with each other via a first communication channel 24. While the first communication channel 24 can be configured in a variety of ways, in one arrangement, the first communication channel 24 is configured as a network connection, such as an Internet connection, provided by the mobile operator of the signing device 30. In another arrangement, the first communication channel 24 is configured as a cellular telephone network connection. The client device 20, such as a computerized device, and the transaction server 40 communicate with each other via a second communication channel 22, such as a network (e.g., Internet) connection, which is distinct from the first communication channel 24. It should be understood that communication channels 22, 24 may be real-time communication channels or they may be store-and-forward type communication channels (such as for example, a channel devoted to e-mail communication) or any other kind of communication channel or a combination thereof.

The embodiments of this invention rely on one or more cryptographic keys known to the signing device 30, and the transaction server 40. The keys are required to perform a multitude of different cryptographic operations and will hereafter be identified by their usage during communication between the transaction server 40 and the signing device 30. A transaction-signing key (or keys) 58 is used to provide integrity protection of data by creating and verifying digital signatures for the data. A transaction-encryption key (or keys) 62 is used to provide privacy protection of data by encrypting and decrypting the data. An authentication key (or keys) 56 is used to authenticate the signing device 30 to the transaction server 40 or to authenticate the transaction server 40 to the signing device 30. As an alternative, the authentication key or keys 56 may be used to authenticate the signature request 60. In various arrangements, the transaction signing key 58, the transaction encryption key 62, and the authentication key 56 may be identical keys, may be derived from a common master key, or may be independently provisioned keys. Finally, any of the cryptographic keys 56, 58, 62 used in this invention may be shared symmetric keys or asymmetric key-pairs.

In one arrangement, a user is in possession of the client device 20 and the signing device 30. The client device 20 is configured to submit and confirm a transaction request 50 transmitted to the transaction server 40. The signing device 30 is configured to generate a digital signature associated with the transaction. In one arrangement the signing device 30 has been provisioned with a transaction signing application and the required cryptographic keys 56, 58, 62.

In use, the user submits a transaction request 50, including transaction data 52, to the transaction server 40 using the client device 20 (e.g., using a web browser executed by the client device 20) over the second communication channel 22. For example, the user may submit a request to transfer $5,000 from account A to account B. In response to receiving the transaction request 50, the transaction server 40 communicates certain transaction data 64 as part of a signature request 60 to the signing device 30 (e.g., a transaction signing application executed by the signing device 30) over the first communication channel 24. The transaction server 40 uses cryptographic keys 56, 58, 62 to sign and encrypt the transaction data 64 of the signature request 60 for integrity and privacy protection. The transaction data 64, in addition to including some or all of the original transaction data 52, may also include additional data added by the remote transaction server 40, such as, for example, a nonce or a challenge value to uniquely identify the transaction.

The signing device 30, executing a transaction signing application, decrypts the transaction data 64 and verifies the signature on the transaction data 64 and displays the decrypted transaction data 64 to the user, such as by a display 65 associated with the signing device 30. The user verifies that the transaction data 64 matches the original transaction data 52 submitted by the client device 20. If the user detects a match between the transaction data 52 and the displayed transaction data 64, the user instructs the signing device 30 to generate and display a digital transaction signature 70 for that transaction. The signing device 30 uses the transaction signing key 58 and the transaction data 64 transferred to the device 30 to generate a digital signature (e.g., a digital signature value) 70 for the transaction. The transaction server 40 prompts the user, via the client device 20 for the transaction signature 70 generated by the signing device 30. The user enters the transaction signature 70 provided by the signing device 30 into the client device 20 and submits the transaction signature 70 to the transaction server 40 to confirm the transaction. However, in another embodiment, the signing device 30 sends the transaction signature 70 directly back to the transaction server 40 once the user verifies the transaction.

With such a process, by generating the transaction signature 70 on a signing device 30 separate from the client device 20 where the transaction was initiated, the transaction system 10 provides a level of security to the transaction between the client device 20 and the transaction server 40. For example, assume that the client device 20 includes, unknown to the user, malware configured to modify data or other information transmitted to the transaction server 40. Further assume the case where the malware were to modify the transaction data 52 transmitted to the transaction server 40. In such a case, because of the malware's modification of the transaction data 52 and based upon the user's comparison of the transaction data 52 with the displayed transaction data 64, the user can detect a difference between the data values 52, 64. Accordingly, with such detection, the user can reject the transaction with the transaction server 40 as he realizes that the security of the transaction has been compromised.

Figure 2:
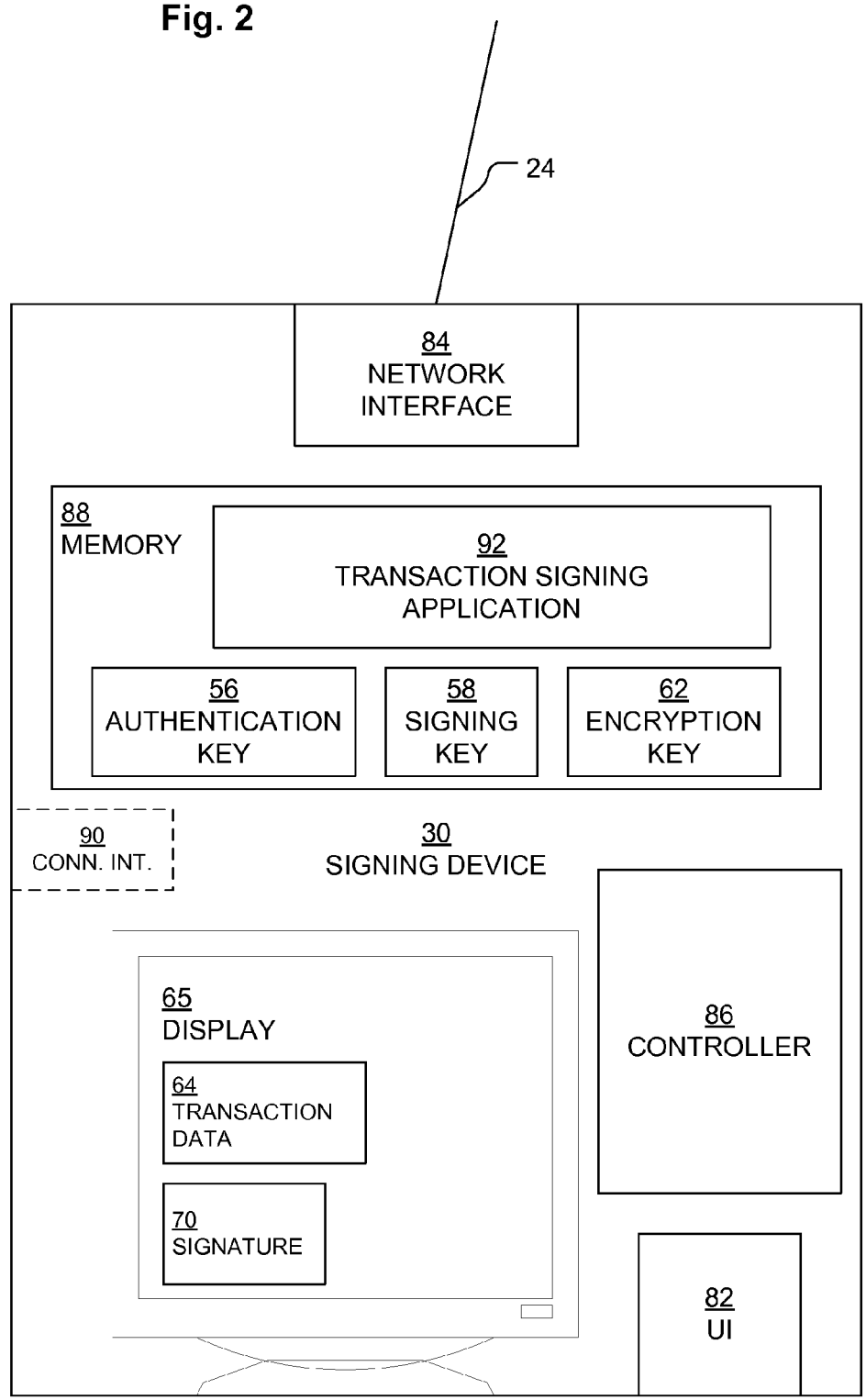
FIG. 2 illustrates an example apparatus of one embodiment.

FIG. 2 illustrates an example embodiment of the signing device 30 in greater detail. Signing device 30 includes a display device 65, a user interface 82, a network interface 84 for interfacing with first communication channel 24 (e.g., a cellular transmitter/receiver), a controller 86, memory 88, and an optional local connection interface 90. Display device 65 may be an integrated display screen or it may be an external display screen. User interface 82 may be incorporated into the display device 65, such as in the case of a touch-sensitive screen on a mobile device. Alternatively, user interface may include a separate keyboard or keypad (internal or external), a mouse, trackball, track pad, or other similar device (also internal or external), or any other input device known to Man, such as an audio input coupled with voice recognition software.

Controller 86 may be any sort of controller, such as, for example, a general purpose processor or microprocessor, a central processing unit, or a set of dedicated circuitry designed to perform particular operations in hardware. Memory 88 may be made up of one or more of the following: volatile random access memory, non-volatile read-only memory, non-volatile flash memory, magnetic storage, optical storage, etc. In one embodiment, memory 88 stores a transaction signing application 92. Transaction signing application 92 contains a set of instructions to be executed by processor 86 in order to carry out one or more embodiments. Memory 88 also stores the values of the authentication key 56, transaction-signing key 58, and transaction-encryption key 62.

Figure 3:
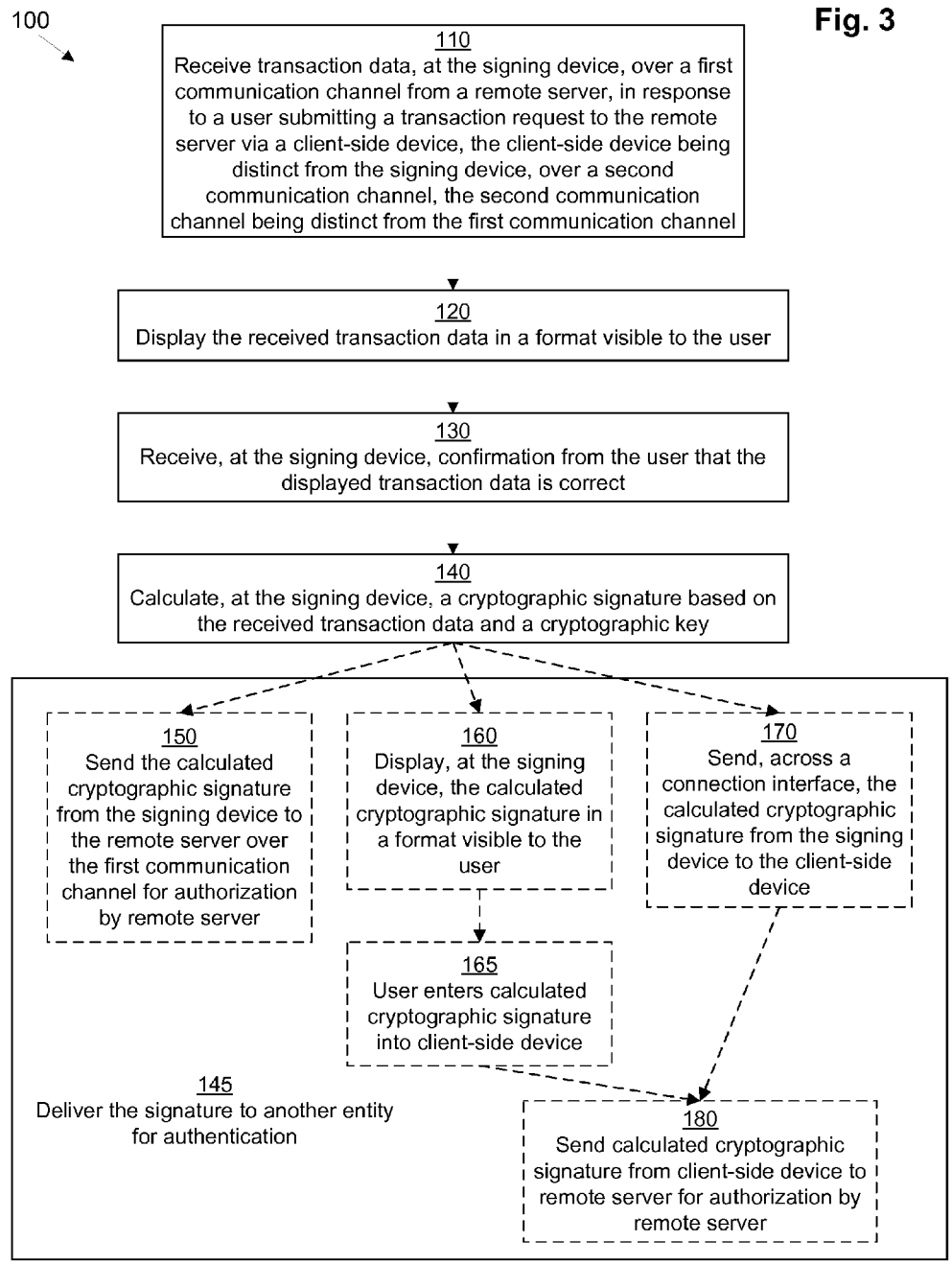
FIG. 3 illustrates an example method of one embodiment.

In operation, signing device 30 performs a method 100 depicted in FIG. 3. It should be understood that whenever signing device 30 is described as performing an action, it is the controller 86 that performs the operation or causes the operation to be performed (in some embodiments, by performing a step stored in transaction signing application 92).

The method has five steps, steps 110, 120, 130, 140, and 150. Additional steps may be performed in some embodiments.

In step 110, signing device 30 securely receives transaction data 64 over first communication channel 24 (via network interface 84) from a remote server 40 (also known as a transaction server 40 or remote transaction server 40), in response to a user submitting a transaction request 50 to the remote transaction server 40 via a client-side device 20 over a second communication channel 22. Signing device 30 securely obtains the transaction data 64 within signature request 60.

In some embodiments, signing device 30 receives the transaction data 64 as a signed and encrypted communication and decrypts it using encryption key 62. In one embodiment, the encryption key 62 is identical to the signing key 58, while in another embodiment, the encryption key 62 is distinct from the signing key 58.

In some embodiments, signing device 30 is a cellular telephone and receives signature request 60 including transaction data 64 encoded in one or more Short Message Service (SMS) text messages (or any other cellular protocol for transmitting and receiving short messages). In other embodiments, since transaction data 64 may be too long to fit within a text message, signing device 30 is preconfigured with the URL of an Internet site from which to retrieve transaction data 64, in which case, either the user directs the signing device 30 to visit the pre-configured URL, or remote transaction server 40 sends a message to signing device 30 instructing the signing device 30 to visit the pre-configured URL. In still another embodiment, signing device 30 receives a message by SMS, e-mail, or another data channel containing the URL of an Internet site from which to retrieve transaction data 64. Signing device 30 then downloads the transaction data 64 from the Internet site (preferably in encrypted form, as above) by following the link. In other embodiments, transaction data 64 or a link to an Internet site containing the transaction data 64 may be received by the signing device 30 by e-mail.

It should be understood that the transaction data 64 typically contains a plurality of data values. In some embodiments, these data values are values that identify a financial transaction that the user desires to perform with a bank or other financial institution via the remote transaction server 40.

In step 120, signing device 30 displays at least part of the received transaction data 64 in a format visible to the user. This is done by displaying the transaction data 64 on display 65 so that user can see the transaction data 64. There may be more transaction data 64 than can be displayed on the display 65 at one time. In such a case, the transaction data 64 may be displayed in a scrollable window so that the user can scroll through the transaction data 64. In some embodiments, only part of the transaction data 64 is displayed. In some embodiments, signing device 30 may pre-mark certain data values within the transaction data 64. In one embodiment, any data value that has previously been received and confirmed as accurate in a previous transaction may be marked as Previously-Verified. In another embodiment, any data value that has not been previously received and confirmed as accurate in a previous transaction may be marked as Suspect. For example, Suspect data values may be displayed in a bold red color to stand out to the user.

In step 130, signing device 30 receives confirmation from the user, via the user interface 82, that the displayed transaction data 64 is correct. The transaction data 64 displayed on display 65 should match the transaction data 52 originally entered by the user while first setting up the transaction request 50. Since it would be difficult for a counterfeit remote server to be aware of this data, the user can verify that the signing device 30 has connected with the correct remote transaction server 40. In some embodiments, if any of the data values displayed within the transaction data 64 have been marked as Suspect (or, alternatively, have not been marked as Previously-Verified), signing device 30 may be configured not to actually confirm the transaction data until the user independently verifies each Suspect data value.

In some embodiments, in addition to the user confirming the correctness of the transaction data 64 displayed on display 65, the user may also input additional transaction data not transmitted to the signing device 30 by the remote transaction server 40. This may provide additional security, provided that only a small amount of data is so provided. For example, the transaction data 64 may not include the dollar amount of the transaction. Thus, in order to fully confirm the transaction, the user is asked to enter the dollar amount of the transaction (e.g., $5,000) into the signing device. This additional transaction data is also used by the signing device 30 to calculate the transaction signature 70 in step 140, below.

In step 140, once the transaction data 64 (including any Suspect values) has been verified by the user, signing device 30 calculates a transaction signature 70 based on the received transaction data 64 and signing key 58 (which may or may not be the same as or related to encryption key 62). For example, signing device may use a cryptographic hashing procedure on the received transaction data 64. In some embodiments, the additional transaction data entered by the user is used in this calculation as well. The cryptographic transaction signature 70 may be a numeric value or it may be a visual representation, such as, for example, a barcode. By cryptographically processing the transaction signature 70, once remote transaction server 40 eventually receives the transaction signature 70 (as described below in connection with alternative steps 150 and 180), remote transaction server 40 can verify that the user of the client-side device 20 is also in possession of an authorized signing device 30 and that the user is therefore unlikely to be a malicious attacker who has stolen the user's information and is attempting to submit a fraudulent transaction. This is because signing key 58 is known only to remote transaction server 40 and signing device 30.

After step 140, there are several possible conclusions to method 100. These conclusions are subsumed within general step 145, in which the signing device 30 delivers the signature to another entity for authentication. General step 145 has at least three possible paths—beginning with steps 150, 160, and 170.

In step 150, signing device 30 sends the transaction signature 70 directly back to remote transaction server 40 via first communication channel 24 once the user verifies the transaction data 64.

In alternative step 160, signing device 30 displays the transaction signature 70 to the user on display 65. The user is then able to perform step 165 by entering the transaction signature 70 into the client-side device 20 (e.g., into a dialog box presented by a browser running on client-side device 20 upon attempting to complete a transaction). In one embodiment, user uses a scanning device of the client-side device 20 to scan a bar code representing the transaction signature 70 displayed on display 65.

Alternatively, in step 170, signing device 30 may communicate directly with client-side device via local connection interface 90 (e.g., a universal serial bus connection) and send the transaction signature 70 to the client-side device 20 over the local connection interface 90.

Following steps 165 or 170, the client-side device 20 sends the transaction signature 70 to the remote transaction server 40 over the second communication channel 22 so that the remote transaction server 40 can authorize the transaction.

While various embodiments of the invention have been particularly shown and described, it will be understood by those skilled in the art that various changes in form and details may be made therein without departing from the spirit and scope of the invention as defined by the appended claims.

For example, if substantially identical transaction data 52 is used in multiple transactions between the client device 20 and the transaction server 40, the signature values 70 for those transactions may be identical. To minimize the possibility of duplicate signature values 70 and to configure the system 10 to treat each transaction between the client device 20 and the transaction server 40 as being unique, the signing device 30 is configured to include transaction-specific data (e.g., a nonce, transaction ID, timestamp, etc,) when generating or computing the transaction signature 70.

As indicated above, the transaction system 10 includes two distinct communication channels; a second communication channel 22 between the client device 20 and the transaction server 40 and a first communication channel 24 between the transaction server 40 and the signing device 30. In one arrangement, malware on the signing device 30 could potentially bypass the security provided by the system 10 by utilizing the signing device 30 for both submission of the transaction request 50 (e.g., using their mobile device browser) and the transaction signature 70 generation. In one arrangement, the transaction server 40 is configured to perform a risk-based authentication (RBA) utilizing geo-location information associated with the communication channels 22, 24. For example, the transaction server 40 can be configured to check geo-location information associated with the devices 20, 30, such as an Internet Protocol (IP) address associated with the client device 20 and the signing device 30, to ensure separate communication channels 22, 24 are being used. It should be noted that the risk-based authentication (RBA) can also be performed by the signing device 30, in an alternate embodiment, as well.

As indicated above, transaction data 64 is verified by a user. In one arrangement, a complicated transaction can include a plurality of data values encoded using many symbols such as letters or digits. Accordingly, user verification can be error-prone. In one arrangement, to minimize errors, to provide an additional verification check, the signing device 30 is configured to hash at least part of transaction data values 64 and display the hash, a value derived from the hash value, or an image or images associated with at least parts of the hash values on the signing device 30. The transaction server 40 can then instruct the user to only transmit the transaction signature 70 to the transaction server 40 if the hash, the value derived from at least part of the hash value, or the one or more images associated with at least part of the transaction data values 64 or hash value displayed by the signing device 30 is recognized by the user. Visual verification of generated images can be less error prone than strings representing the hash values.

In one arrangement, as indicated above, the signing device 30 has been provisioned with a transaction signing application 92 and a signing key 58, such as a symmetric key, shared with the transaction server 40. The symmetric signing key 58, as known by the transaction server 40 and the signing device 30, can be a seed value usable in other algorithms, such as authentication and signing algorithms. The symmetric signing key 58, therefore, allows for strong two-factor authentication (2FA) to be used to gain access to the transaction services and signing of the transactions to be accomplished using the same key. While a symmetric signing key 58 can be used as part of the transaction system 10 it should be understood that a variety of other types of keys can be used as well. For example, the transaction server 40 and the signing device 30 can be configured to utilize an asymmetric key-pair.

In one arrangement, the transaction system 10 uses the concept of whitelisting to ensure that parts of the received transaction data 64 are utilized for well-known or approved use. For example, in one arrangement, transactions typically occur between specific account numbers. The signing device 30 may check the account numbers and if they have not been previously utilized may disallow signing of the transaction or additionally indicate to the user that the account numbers are not recognized. In another arrangement, whitelisting is applied to URLs that specify the address of an Internet site from which to retrieve transaction data 64.

In another arrangement, the transaction system 10 incorporates the concept of whitelisting to ensure that the communication channels 22, 24 are utilized for well-known or approved use. For example, in one arrangement, transactions typically occur during specific time periods (e.g., transactions occur over communication channels 22, 24 between 9 AM and 5 PM Eastern Standard Time, Monday through Friday). Accordingly, with the concept of whitelisting, the communication channels 22, 24 are associated with this particular timeframe. Accordingly, when the communication channels 22, 24 are utilized, the transaction server 40 reviews the time of utilization of the channels 22, 24. If the time of utilization of the channels 22, 24 falls within the aforementioned timeframe, the transaction server 40 allows the transaction to continue. However, if the time of utilization of the channels 22, 24 falls outside of the aforementioned timeframe, the transaction server 40 disallows continuation of the transaction. While the concept of whitelisting can be applied to the communication channels 22, 24, whitelisting can also be applied to other aspects of the transaction system 10 as well.

For example, certain transaction details may be pre-configured within signing device 30. Thus, signing device 30 may be pre-configured to only accept transfers that originate or terminate in a particular bank account. For example, a corporate treasurer may only be authorized to transfer money from or to a particular corporate account. If transaction data 64 received by signing device 30 indicates any other account, transaction data 64 may be modified to included the pre-configured account instead of the originally-received account before the transaction signature 70 is calculated, which would flag to the remote transaction server 40 that the transaction data 64 was incorrect. In another embodiment, the pre-configured details may not be transmitted within the signature request 60 at all. In such case, the signing device 30 may automatically fill in the missing details, such as the destination account number. If multiple destination accounts are permitted, the signing device 30 may prompt the user on screen 64 to ask which of the several pre-configured destination accounts the user wishes to send the money to. If the original transaction data 52 indicated a different account, then the transaction signature 70 would indicate to the remote transaction server 40 that the user may be attempting an unauthorized transfer.

As indicated above, the transaction server 40 transmits the signing request 60 to the signing device 30 using the first communication channel 24. It should be noted that the signing request 60 can be transmitted in a variety of ways. For example, the signing request 60 can be transmitted from the transaction server 40 to the signing device 30 via e-mail, a proprietary protocol, an application-directed binary SMS message, etc. Alternatively, the signing device 30 can actively pull or extract the signing request 60 and transaction data 64 from the transaction server 40.

As indicated above, the signing device 30 is configured to generate a digital signature (e.g., a digital signature value) 70 for a transaction and a user manually enters the transaction signature 70, provided by the signing device 30, into the client device 20 and submits the transaction signature 70 to the transaction server 40 to confirm the transaction. Such description is by way of example only. In one arrangement, the signing device 30 is configured to transmit the transaction signature 70 to the client device 20 such as by a Bluetooth, wireless, or WiFi connection between the client device 20 and the signing device 30. The signing device 30 is configured to transmit the transaction signature 70 to the client device 20 by other wireless or optical connections such as an infrared connection.

As indicated above, the signing device 30 and the client device 20 are indicated as being physically separate devices.

In one arrangement, the client device 20 and the signing device 30 form part of a single physical unit and include a virtual separation therebetween. In such an arrangement, it should be noted that the client device 20 and signing device 30 each maintain a correspondingly distinct communication channel 22, 24, respectively, with the transaction server 40.

As indicated above, the signing device 30 is configured with a signing device application configured to generate the transaction signature 70. In one arrangement, the signing device 30 does not include a signing device application. In such an arrangement, the transaction server 40 generates a digital signature value 70 derived from the transaction data 52, session data for the user, the cryptographic key 58 such as a symmetric key, and nonce. The transaction data 52 is delivered over an encrypted connection to the first communication channel 24. The signing device 30 is configured with a receiving application (e.g., e-mail, SMS, etc.) for viewing the transaction details and a signature value 70. The user then enters the signature value 70 on the client device 20 as a confirmation of the transaction and transmits the signature value 70 to the transaction server 40.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed in a first client-side device, the method comprising:
   receiving transaction data, at the first client-side device, over a first communication channel from a remote server, in response to a user submitting a transaction request to the remote server via a second client-side device, the second client-side device being distinct from the first client-side device, over a second communication channel, the second communication channel being distinct from the first communication channel;
   displaying the received transaction data in a format visible to the user;
   receiving, at the first client-side device, confirmation from the user that the displayed transaction data is correct;
   receiving, at the first client-side device, additional transaction data from the user, the additional transaction data including information concerning the transaction request not included within the received transaction data;
   in response to receiving the confirmation from the user, calculating, at the first client-side device, a cryptographic signature based on the received transaction data and a cryptographic key; and
   delivering the cryptographic signature to another entity for authentication, wherein delivering includes:
      sending the calculated cryptographic signature from the first client-side device to the remote server over the first communication channel;
      wherein calculating includes calculating the cryptographic signature based on the received transaction data, the additional transaction data, and the cryptographic key.

2. A method as in claim 1 wherein receiving the transaction data includes:
   receiving, at the first client-side device, an encrypted signal over the first communication channel; and
   decrypting, at the first client-side device, the encrypted signal to recover the transaction data.

3. A method as in claim 1 wherein:
   the first client-side device is an Internet-enabled cellular telephone;
   the first communication channel includes a cellular network connection; and
   receiving the transaction data includes:
      receiving a message over the cellular network connection according to a cellular protocol for short messages, the message including a link to an Internet site; and
      downloading the transaction data from the Internet site using the link.

4. A method as in claim 1 wherein receiving the transaction data includes downloading the transaction data from an Internet site using a preconfigured link.

5. A method as in claim 1 wherein:
   the received transaction data includes a plurality of data values;
   displaying the received transaction data in a format visible to the user includes marking as suspect all data values of the plurality of data values that have not previously been authorized by the user; and
   receiving confirmation from the user that the displayed transaction data is correct includes receiving a separate user override command for every data value of the plurality of data values that has been marked as suspect.

6. A method as in claim 5 wherein marking as suspect all data values of the plurality of data values that have not previously been authorized by the user includes:
   receiving, from the remote server, a set of risk scores, calculated with a risk-based decision engine, the set of risk scores corresponding to the plurality of data values; and
   identifying data values as suspect based on their respective risk scores.

7. A method as in claim 1 wherein:
   the received transaction data includes a plurality of data values;
   the first client-side device is pre-configured with a particular data value; and
   calculating includes calculating the cryptographic signature based on the received transaction data, the pre-configured particular data value, and the cryptographic key.

8. A method as in claim 1 wherein the transaction data includes a unique data value that serves to identify the transaction, the unique data value being unrelated to a transaction associated with the transaction data.

9. A method as in claim 1 wherein:

the method further includes calculating a unique counter value;

calculating the cryptographic signature includes calculating the cryptographic signature based on the received transaction data, the unique counter value, and the cryptographic key.

10. An apparatus comprising:

memory, the memory storing a cryptographic key;

a network interface for communicating with a remote server over a first communication channel;

a display device;

a user interface; and a controller, the controller configured to:

receive transaction data via the network interface from the remote server over the first communication channel, in response to a user submitting a transaction request to the remote server via a client-side device, the client-side device being distinct from the apparatus, over a second communication channel, the second communication channel being distinct from the first communication channel;

cause the display device to display the received transaction data in a format visible to the user;

receive, via the user interface, confirmation from the user that the displayed transaction data is correct;

receive, via the user interface, additional transaction data from the user, the additional transaction data including information concerning the transaction request not included within the received transaction data;

in response to receiving the confirmation from the user, calculate a cryptographic signature based on the received transaction data and the cryptographic key stored in memory; and deliver the cryptographic signature to another entity for authentication, wherein, while delivering the cryptographic signature to the other entity for authentication, the controller is configured to:

send the calculated cryptographic signature to the remote server over the first communication channel via the network interface;

wherein calculating includes calculating the cryptographic signature based on the received transaction data, the additional transaction data, and the cryptographic key.

11. An apparatus as in claim 10 wherein the controller, when receiving the transaction data via the network interface, is configured to:

receive, via the network interface, an encrypted signal over the first communication channel; and decrypt the encrypted signal to generate the transaction data.

12. An apparatus as in claim 10 wherein:

the apparatus is an Internet-enabled cellular telephone;

the first communication channel includes a cellular network connection; and the controller, when receiving the transaction data via the network interface, is configured to:

receive a message over the cellular network connection according to a cellular protocol for short messages, the message including a link to an Internet site; and download the transaction data from the Internet site using the link.

13. An apparatus as in claim 10 wherein:

the received transaction data includes a plurality of data values;

the controller, when causing the display device to display the received transaction data in a format visible to the user, is configured to mark as suspect all data values of the plurality of data values that have not previously been authorized by the user; and the controller, when receiving confirmation from the user that the displayed transaction data is correct, is configured to receive a separate user override command for every data value of the plurality of data values that has been marked as suspect.

14. In a transaction server, a method for authenticating a transaction, the method comprising:

receiving, by the transaction server on a first communication channel, a transaction request from a client device;

transmitting, by the transaction server on a second communication channel, a signature request to a signing device, the second communication channel being distinct from the first communication channel and the signing device being distinct from the client device;

receiving, by the transaction server, a cryptographic signature generated by the signing device based on (a) transaction data provided by the transaction server as part of the signature request, (b) additional transaction data from the user, and (c) a cryptographic key provided to the signing device by the transaction server;

calculating, by the transaction server, an expected cryptographic signature based on original transaction data included in the transaction request from the client device and the cryptographic key; and authenticating the transaction if and only if the received cryptographic signature matches the expected cryptographic signature.

15. A method as in claim 1 wherein the cryptographic key is provided to the first client-side device by the remote server.

16. A method as in claim 1 wherein receiving the transaction data over the first communication channel from the remote server includes receiving, at the first client-side device, the transaction data within a signature request transmitted from the remote server to the first client-side device over the first communication channel, the signature request further including a request for the first client-side device to provide the cryptographic signature in response to confirming that the transaction data is correct.

17. An apparatus as in claim 10 wherein the cryptographic key stored in memory is provided to the apparatus by the remote server.

18. An apparatus as in claim 10 wherein the controller, when receiving the transaction data from the remote server over the first communication channel, is configured to receive the transaction data within a signature request transmitted from the remote server to the apparatus over the first communication channel, the signature request further including a request for the apparatus to provide the cryptographic signature in response to confirming that the transaction data is correct.

* * * * *